US007030883B2

(12) United States Patent
Thompson

(10) Patent No.: US 7,030,883 B2
(45) Date of Patent: Apr. 18, 2006

(54) SYSTEM AND METHOD FOR FILTERING A SYNCHRONIZATION SIGNAL FROM A REMOTE COMPUTER

(75) Inventor: Kerry Thompson, North Salt Lake, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 4 days.

(21) Appl. No.: 10/797,652

(22) Filed: Mar. 10, 2004

(65) Prior Publication Data

US 2005/0200626 A1 Sep. 15, 2005

(51) Int. Cl.
*G06F 15/16* (2006.01)
*G06F 15/80* (2006.01)

(52) U.S. Cl. ........................ 345/502; 345/504; 345/505

(58) Field of Classification Search ................ 345/502, 345/504, 505, 501, 503, 204, 211, 212, 213
See application file for complete search history.

(56) References Cited

U.S. PATENT DOCUMENTS 5,121,086 A * 6/1992 Srivastava ................... 331/11
6,421,636 B1 7/2002 Cooper et al.
6,538,656 B1 * 3/2003 Cheung et al. ............. 345/519
6,646,645 B1 * 11/2003 Simmonds et al. ......... 345/502
6,690,655 B1 * 2/2004 Miner et al. ................ 370/278
6,831,648 B1 * 12/2004 Mukherjee et al. ......... 345/504
2004/0207618 A1 * 10/2004 Williams et al. ............ 345/212
2005/0093854 A1 * 5/2005 Kennedy et al. ............ 345/213

FOREIGN PATENT DOCUMENTS

EP 0880282 5/1993
WO WO 0157581 8/2001
WO WO 0223824 3/2002

OTHER PUBLICATIONS

Hans Holten-Lund, M.Sc., Design for Scalability in 3D Computer Graphics Architectures, Jul., 2001, p. 168.

* cited by examiner

*Primary Examiner*—Kee M. Tung
*Assistant Examiner*—Joni Hsu
(74) *Attorney, Agent, or Firm*—Thorpe North & Western LLP

(57) ABSTRACT

The invention provides a system and method for filtering a video synchronization signal sent from a remote computer. The method can include the operation of receiving a stream of at least n sync signals from the remote computer and storing the most recently received n sync signals in an array. A further operation can be comparing an n+1 sync signal with each of the n sync signals in the array to form a comparison for each of the n sync signals in the array. Another operation is replacing the oldest of the n sync signals in the array with the n+1 sync signal. A further operation is using the n+1 sync signal to synchronize at least one graphics processing card in each of a plurality of graphics processing computers if the comparisons of the n sync signals in the array are greater on the average than a preset threshold.

13 Claims, 4 Drawing Sheets

SYSTEM AND METHOD FOR FILTERING A SYNCHRONIZATION SIGNAL FROM A REMOTE COMPUTER

FIELD OF THE INVENTION

The present invention relates generally to filtering of sync signals using a personal computer.

BACKGROUND

As monitors become less expensive, desktop PCs and workstations with multiple displays are rapidly becoming commonplace. The cost of a display can increase exponentially with size. Using multiple, smaller screens to achieve greater screen area is more cost effective than using one large display. Multiple screens can also be useful in fields such as simulation, where wrap around screens are needed for the realistic reproduction of the simulation environment.

Displaying information on multiple screens can be technically challenging. When using multiple screens to display a single image, the point at which the image stops on one screen and starts on another must be coordinated. The resolution and refresh rate of each of the displays must be synchronized. If more than one computer is used to drive the single image on multiple displays, the image data from the computers to the monitors must also be synchronized.

When using a non-deterministic (non real-time) operating system, synchronizing the image data can be problematic. Even when a synchronization signal is simultaneously sent to each of the computers operating the displays, timing problems can still occur due to the non-deterministic nature of the operating system. For example, if three computers all receive a sync signal, the thread that receives the sync signal may not be activated immediately upon arrival of a new sync packet. This can result in three different signals that may be off by several milliseconds. The sync signal timing discrepancies can cause image tearing. Image tearing occurs when the image data is updated slower than the screen is updated. This causes odd tearing effects to appear on the screens. In systems using multiple displays tearing artifacts can occur between moving images on adjacent unsynchronized screens.

Unsynchronized screens can also cause other temporal effects, wherein noticeable images on the screens for a short duration, such as bright flashes, may not appear simultaneously on all displays if the display devices are not synchronized. What is needed is a method for filtering the sync signals to determine whether each sync signal is within a predetermined acceptable deviation that will not visibly interfere with the images on the multiple displays.

SUMMARY OF THE INVENTION

The invention provides a system and method for filtering a video synchronization signal sent from a remote computer. The method can include the operation of receiving a stream of at least n sync signals from the remote computer and storing the most recently received n sync signals in an array. A further operation can be comparing an n+1 sync signal with each of the n sync signals in the array to form a comparison for each of the n sync signals in the array. Another operation is replacing the oldest of the n sync signals in the array with the n+1 sync signal. A further operation is using the n+1 sync signal to synchronize at least one graphics processing card in each of a plurality of graphics processing computers if the comparisons of the n sync signals in the array are greater on the average than a preset threshold.

DETAILED DESCRIPTION

Figure 1:
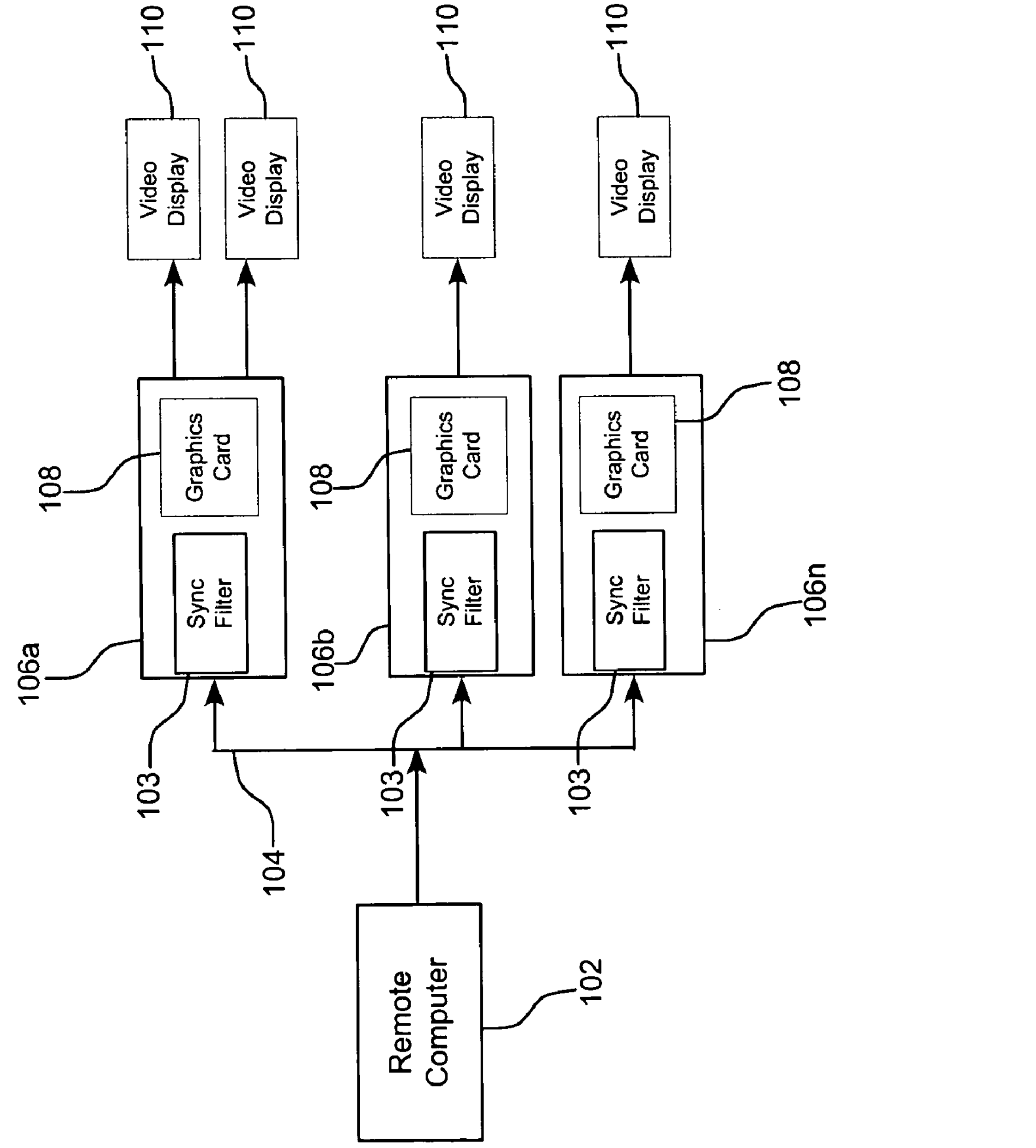
FIG. 1 is a block diagram illustrating a system for filtering a video synchronization signal sent from a remote computer to a plurality of graphics processing computers, each graphics processing computer in communication with a sync filter in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In order to overcome the problems described and to provide an efficient method for using a plurality of computers to process a graphic image, the present invention provides a system and method for filtering synchronization signals from a remote computer as illustrated in FIG. 1. A remote computer can be any computer connected remotely from a plurality of computers used for processing graphic images to be displayed as a single image on a plurality of display screens. The system comprises a remote computer 102 in communication with a plurality of graphics processing computers 106*a–n* through a network 104. The network 104 can comprise any medium through which the remote computer 102 may communicate with the graphics processing computers 106*a–n*. Each of the graphics processing computers 106*a–n* can be coupled to at least one graphics card 108 and in communication with a sync filter 103. The output from the graphics card can be sent to one or more video displays 110. The sync filter 103 can be configured as software stored in the graphics processing computers 106*a–n*.

Figure 2:
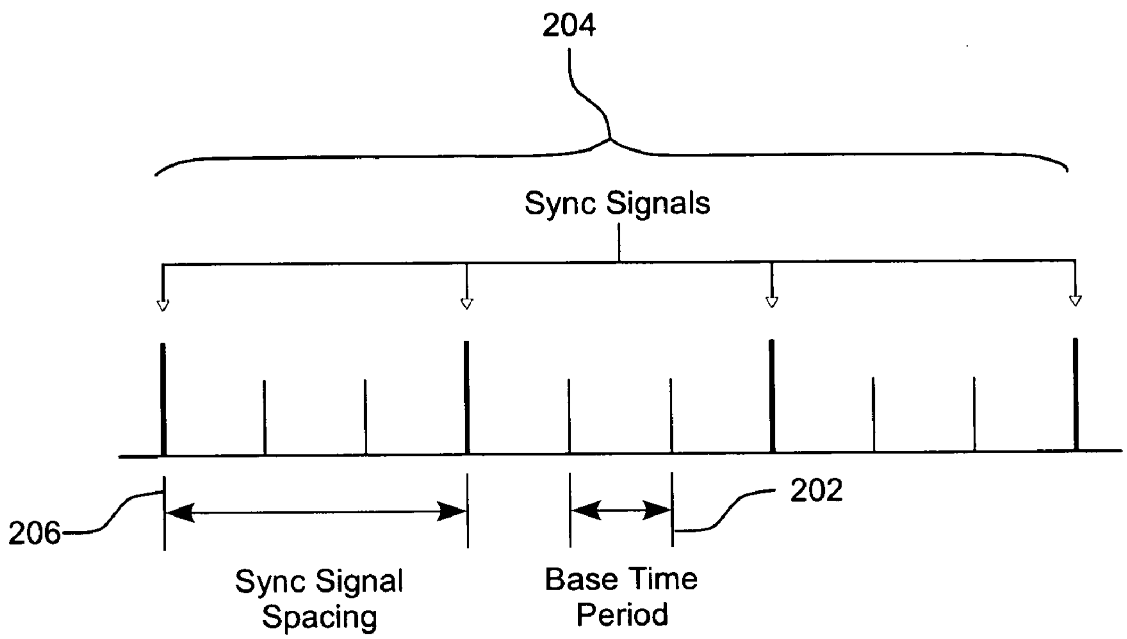
FIG. 2 is a diagram illustrating an embodiment showing the spacing of the sync signals.

Synchronization signals 204 (See FIG. 2) can be sent from the remote terminal computer 102 to the plurality of graphics processing computers 106*a–n* through the network 104 and then to the sync filter 103. Synchronization signals are periodic signals that are sent at a known frequency and used to synchronize multiple independent processes. In the present invention, the synchronization signal spacing 206 can be constrained to be an integer multiple of a known interval, the base time period 202, as shown in FIG. 2.

Erroneous synchronization signal spacing may be produced as a result of several factors, working singly or in combination. For example, the synchronization signals 204 may not be sent by the remote terminal computer 102.

Transmission delays may occur while the synchronization signals 204 are traveling over the network 104. Also, the receiving computer, in this case the graphics processing computers 106*a–n*, may not be able to time-stamp one or more of the incoming synchronization signals 204 immediately upon receipt due to the non-deterministic nature of the computer operating system.

In order for the plurality of graphics processing computers 106*a–n* to correctly synchronize each graphics card 108 with the remote terminal computer 102, the incoming synchronization signals 204 must be validated. Validating the synchronization signals 204 can be accomplished by sending the synchronization signals through the sync filter 103 before the signals are used to synchronize each of the graphics cards 108 in the graphics processing computers 106*a–n*. Operation of the sync filter 103 consists of two phases: initialization and steady state-operation.

Figure 4:
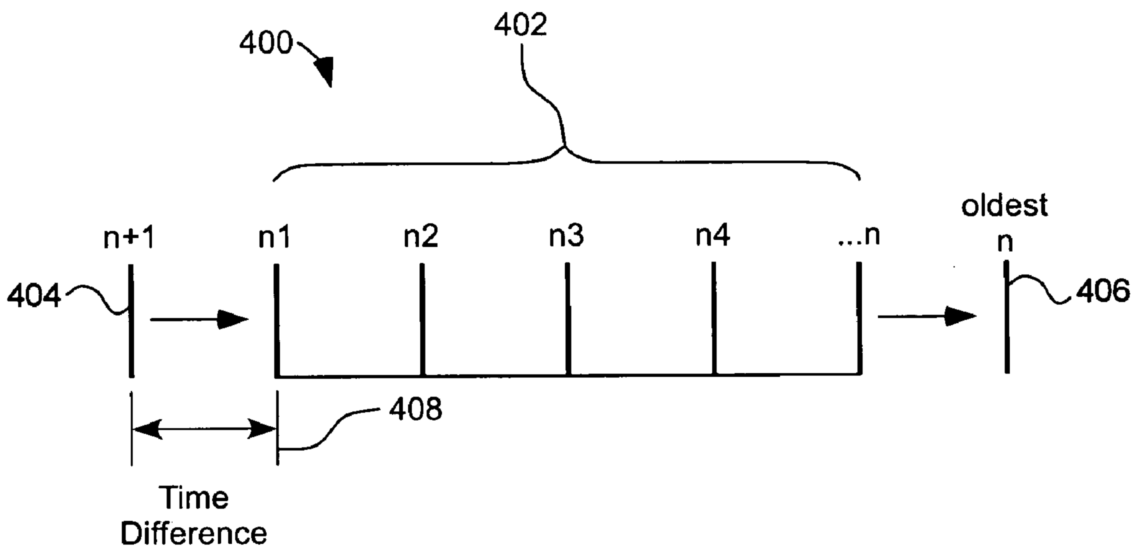
FIG. 4 is a diagram illustrating an embodiment showing the filter initialized with an array of time stamps of incoming synchronization signals.

Initialization of the sync filter 103 ensures that a sufficient history is available prior to steady state operation to enable the filter to make correct evaluations of incoming sync signals, allowing the filter to remove both single errors and bursts of errors. Initialization of the sync filter 103 can be accomplished with an array 400 containing n time stamps 402 of incoming synchronization signals, as shown in FIG. 4. Time stamps are the recorded time that each synchronization signal is received. The array size n can be determined such that the number of erroneous sync signals in a burst will be no more than a small fraction of the total array size. The array 400 allows the filter to rely on past history, permitting the filter to remove bursts of erroneous signals. While the array 400 is being filled with n sync signals 402, or in other words initialized, no filtering can be executed.

Once the array 400 is filled with n time stamps 402 the sync filter 103 will operate in steady state mode and filtering of the synchronization signals can begin. The next synchronization signal received after the array is filled is referred to as the n+1 synchronization signal 404. When an n+1 synchronization signal 404 is received by the sync filter 103, the arrival time of the n+1 synchronization signal 404 can be recorded. Recording the arrival time of a synchronization signal is referred to as time stamping. During initialization, the arrival time of each of the n sync signals 402 in the array 400 is recorded, or time stamped. For each of the n time stamps in the array, a confidence factor vote can be computed on whether the n+1 synchronization signal 404 is valid. A synchronization signal is considered valid if it is received within a predetermined time frame after the previous synchronization signal was received.

Figure 3:
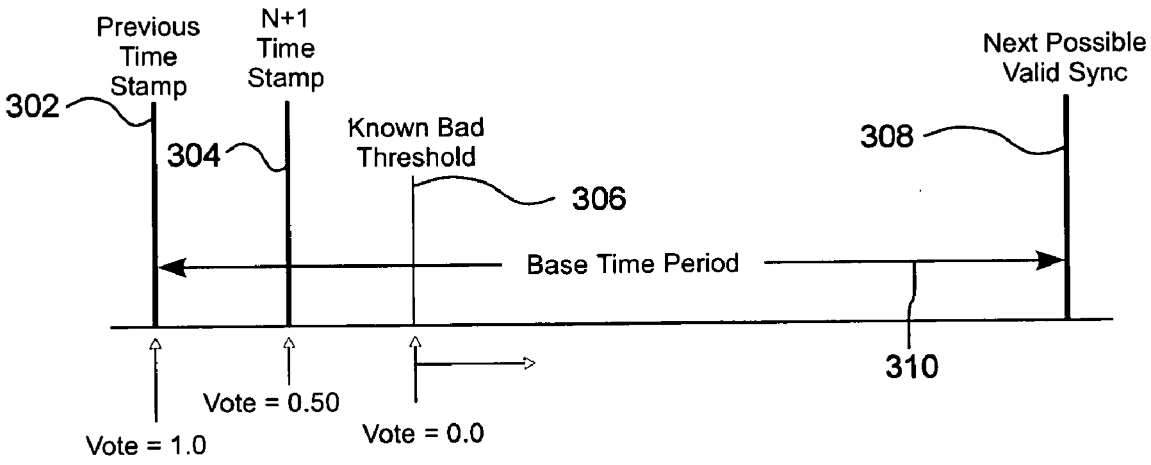
FIG. 3 is a diagram illustrating an embodiment showing the operation of the filter on the sync signals.

The confidence factor vote can be computed by first computing the time difference from the previous time stamp 302 and the n+1 time stamp 304 as shown in FIG. 3. A comparison time can then be computed by finding the absolute time nearest to the previous time stamp 302 that can be achieved by subtracting an integer multiple of the base time period 310 until the comparison time is within plus or minus one half of the base time period 310. For example, if the base time period 310 is 16 milliseconds, and the time difference between the previous time stamp 302 and the n+1 time stamp 304 is determined to be 47.5 milliseconds, then the base time period of 16 milliseconds can be subtracted three times from the time difference until the comparison time is −0.5 milliseconds, within plus or minus one half of the base time period 202, which is +/− half of the base time period of 16 milliseconds, or +/−8 milliseconds. The absolute value of the comparison time can then be compared with a known-bad threshold 306. The known-bad threshold is a preset threshold. In this example, the known-bad threshold may be set to 1 millisecond. If the absolute value of the comparison time exceeds this value, a vote of zero will result. If the absolute value of the comparison time is less than the known-bad threshold, a linear interpolation between zero and the known-bad threshold can be performed using the following formula:

$$\text{vote} = 1.0 - \left(\frac{|\text{Comparison Time}|}{\text{Known Bad Threshold}}\right)$$

In the above example, the absolute value of the comparison time is 0.5 milliseconds, which is less than the known-bad threshold of 1.0 milliseconds. Therefore, the vote for the n+1 time stamp 304 is:

$$\text{vote} = 1.0 - \left(\frac{|-0.5|}{1.0}\right) = 1.0 - 0.5 = 0.5$$

The voting process is repeated for each of the n time stamps 402 in the array 400, n1, n2, n3, n4 . . . n. (see FIG. 4). A multiple of the base time period 202 (see FIG. 2) is subtracted from the time difference 408 between the n+1 time stamp and the n time stamp until the comparison time is within plus or minus one half of the base time period 202 (see FIG. 2). The comparison time can then be compared with the known-bad threshold 306. If the absolute value of the comparison time is greater than the known-bad threshold 306 then a vote of zero results. If the absolute value of the comparison time is less than the known-bad threshold 306 a linear interpolation is performed using the equation above.

The votes from each of the n time stamps 402 can then be averaged. The average vote is compared with a second threshold, an average vote threshold. If the average vote is equal to or greater than the average vote threshold, the synchronization signal is considered to be good. If the average vote is below the average vote threshold, the synchronization signal is considered to be invalid and will not be used for synchronization purposes. For example, if the average vote preset threshold is set to 0.95, and each of the n time stamps' votes are averaged and determined to be 0.96, the synchronization signal will be used to synchronize the graphics cards 108 in each of the graphics processing computers 106*a–n*. If the average vote from each of the n time stamps is determined to be 0.94 then the synchronization signal will not be used by each of the graphics processing computers 106*a–n*.

After the n time stamps 402 have voted on the n+1 synchronization signal 404 and it is determined to be either valid or invalid, the n+1 synchronization signal 404 is added to the array of n time stamps 402 and the oldest time stamp 406 in the array is deleted, thus keeping the n most current time stamps in the array 400.

Figure 5:
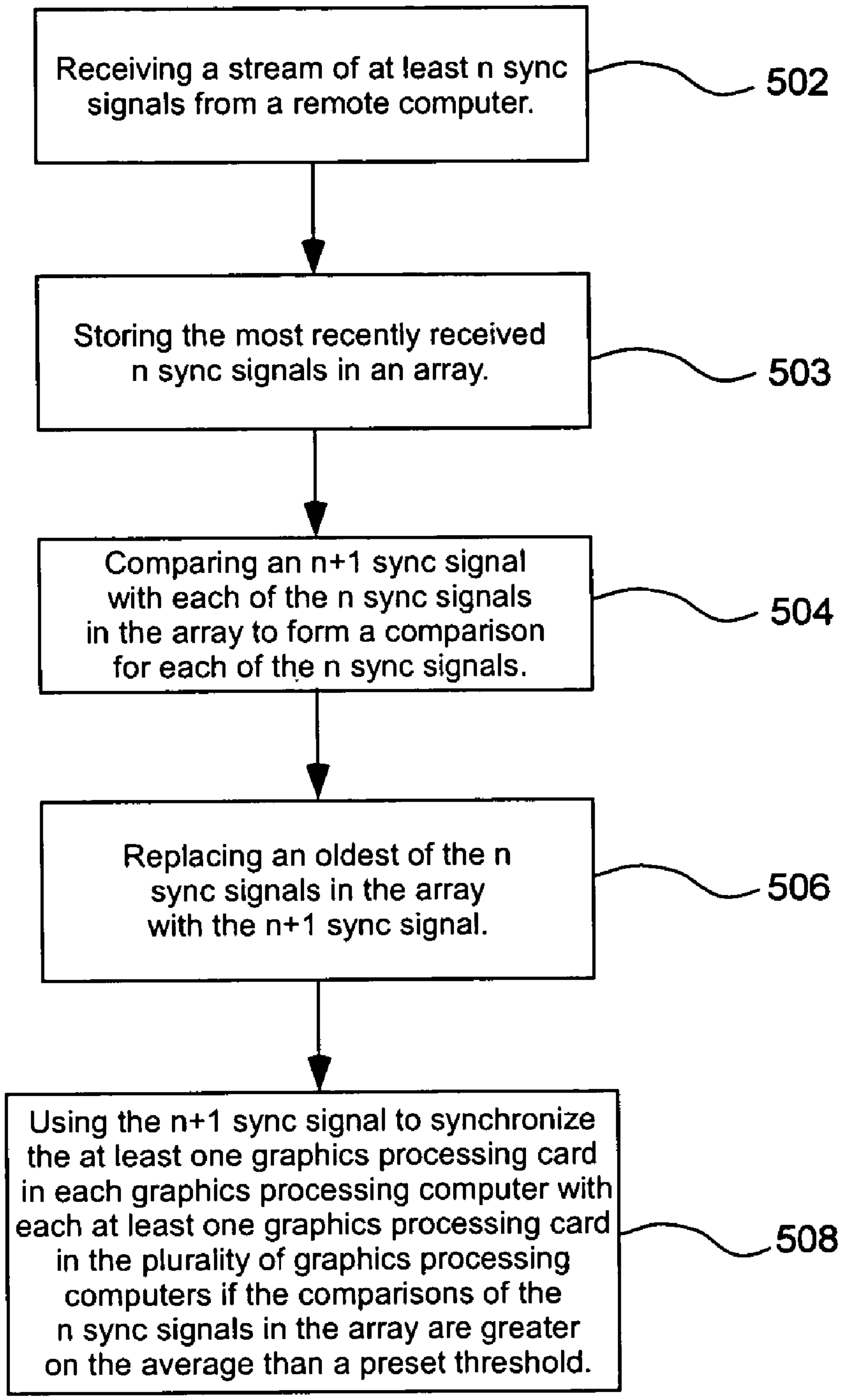
FIG. 5 is a flow chart depicting a method for filtering a video synchronization signal sent from a remote computer in accordance with an embodiment of the present invention.

Another embodiment of the invention provides a method for filtering a video synchronization signal sent from a remote computer as depicted in the flow chart of FIG. 5. By way of example, the apparatus disclosed in FIG. 1 will be referenced in connection with the method shown in FIG. 5. The method includes step 502, which involves receiving a stream of at least n sync signals from the remote computer 102. The n sync signals can be sent from the remote computer 102 through a network 104, to the graphics processing computers 106*a–n*, and into a sync filter 103. The sync filter 103 can be initialized with the n time stamps of the n sync signals. Another operation involves storing the most recently received n sync signals in an array as shown in step 503. A further operation involves comparing an n+1 sync signal with each of the n sync signals in the array to form a comparison for each of the n sync signals in the array, as shown in step 504. Step 504 can include the more specific steps of computing a vote for each comparison. Each vote can be computed as described previously. After the n sync signals have voted, a further step can involve averaging the votes of the n sync signals in the array. After the votes are averaged, a further step can comprise using the n+1 sync signal if the average vote of the n sync signals in the array is greater than a preset threshold. Using the sync signal can comprise using the sync signal to synchronize the data sent from the one or more graphics cards 108 in each of the graphics processing computers 106*a–n* to one or more video displays 110.

Another operation involves replacing an oldest of the n sync signals in the array with the n+1 sync signal, as shown in step 506. A final operation, shown in step 508, is using the n+1 sync signal to synchronize the at least one graphics processing card in each graphics processing computer with each at least one graphics processing card in the plurality of graphics processing computers if the comparisons of the n sync signals in the array are greater on the average than a preset threshold, as previously discussed.

Using the sync filter 103 to synchronize the operation of multiple graphics processing computers 106*a–n* allows the processing of graphical information to be synchronized to within a predetermined threshold, despite the non-deterministic nature of common operating systems. The sync filter also does not require a known-good starting signal. This method of filtering is unaffected by small bursts of errors, as can often occur in synchronization filters. Thus, the sync filter is simple and allows inexpensive, off the shelf computers using common operating systems to be used in place of costly specially designed components.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for filtering a video synchronization signal sent from a remote computer to a plurality of graphics processing computers, each graphics processing computer having at least one graphics processing card and a sync filter, comprising the steps of:

receiving a stream of at least n sync signals from the remote computer;

storing the most recently received n sync signals in an array;

comparing an n+1 sync signal with each of the n sync signals in the array to form a comparison for each of the n sync signals in the array;

replacing an oldest of the n sync signals in the array with the n+1 sync signal; and using the n+1 sync signal to synchronize the at least one graphics processing card in each graphics processing computer with each at least one graphics processing card in the plurality of graphics processing computers if the comparisons of the n sync signals in the array are greater on the average than a preset threshold.

2. A method as in claim 1, wherein the step of receiving an array of n sync signals includes the more specific step of receiving the array of n sync signals at one or more remote computers.

3. A method as in claim 2, wherein the one or more remote computers are used to generate graphical images.

4. A method as in claim 1, wherein the step of comparing an n+1 sync signal with each of the n sync signals includes the more specific steps of:

computing a vote for each of the comparisons of the n sync signals in the array;

averaging the votes of the n sync signals in the array; and using the n+1 sync signal if the average vote of the n sync signals in the array is greater than a preset threshold.

5. A method as in claim 4, wherein the step of receiving an array of n sync signals includes the more specific step of initializing a filter with an array of n time stamps of the n sync signals.

6. A method as in claim 5, wherein the step of computing a vote for each comparison is further comprising the steps of:

computing a time difference between an n time stamp in the array of n time stamps and an n+1 time stamp;

finding a comparison time that is an absolute time nearest to the n time stamp by subtracting an integer multiple of a base time period until the comparison time is within plus or minus one half of the base time period;

comparing an absolute value of the comparison time with a known-bad threshold wherein a vote of zero occurs if the difference exceeds the known-bad threshold; and computing the vote as a linear interpolation between zero and the known-bad threshold.

7. A method as in claim 6, further comprising the step of computing the vote as a linear interpolation equal to one minus the ratio of the absolute value of the comparison time that is less than the known-bad threshold and the known-bad threshold.

8. A method as in claim 1, further comprising the step of operating the sync filter in the plurality of graphics processing computers.

9. A method as in claim 8, further comprising the step of operating the sync filter as software in the plurality of graphics processing computers.

10. A system for filtering a video synchronization signal from a remote computer with a sync filter, comprising:

a dedicated network for sending sync signals from the remote computer to a plurality of graphics processing computers, each graphics processing computer in communication with a sync filter, wherein the filter is comprising:

the sync filter with a memory device configured to store an array of n sync signals;

the sync filter with a processor configured to compare an n+1 sync signal with each of the n sync signals in the array to form a comparison for each of the n sync signals in the array;

the processor, further configured to replace an oldest of the n sync signals in the memory with the n+1 sync signal; and the processor, further configured to send the n+1 sync signal to synchronize the plurality of graphics processing computers if the comparisons are averagely greater than a preset threshold.

11. A system as in claim 10, wherein the processor is further configured to:

compute a vote for each comparison of the n sync signals in the array;

average the votes of the n sync signals in the array; and send the n+1 sync signal to synchronize the plurality of the graphics processing computers if the average vote of the n sync signals in the array is computed to be greater than a preset threshold.

12. A system as in claim 11, wherein the memory is further configured to store an array of n time stamps of the n sync signals.

13. A system as in claim 12, further comprising:

the processor, further configured to compute a time difference between an n time stamp in the array of n time stamps and an n+1 time stamp;

the processor, further configured to compute a comparison time that is an absolute time nearest to the n time stamp by subtracting an integer multiple of a base time period until the comparison time is within plus or minus one half of the base time period;

the processor, further configured to compare the absolute value of the comparison time with a known-bad threshold wherein a vote of zero occurs if the time difference exceeds the known-bad threshold;

the processor, further configured to compute the vote by performing a linear interpolation between zero and the known-bad threshold, wherein the linear interpolation is equal to one minus the ratio of the absolute value of the comparison time that is less than the known-bad threshold and the known-bad threshold.

* * * * *